United States Patent [19]

Strong

[11] Patent Number: 4,504,079
[45] Date of Patent: Mar. 12, 1985

[54] SWAY BAG SUSPENSION SYSTEM

[75] Inventor: John R. Strong, Kirkland, Wash.

[73] Assignee: Paccar Inc., Bellevue, Wash.

[21] Appl. No.: 516,576

[22] Filed: Jul. 25, 1983

[51] Int. Cl.$^3$ .............................................. B60G 5/04
[52] U.S. Cl. ..................................... 280/683; 105/164; 105/197 B; 267/64.27; 280/711; 280/DIG. 1
[58] Field of Search ............... 280/683, 682, 676, 104, 280/711, 713, DIG. 1; 267/64.11, 64.23, 64.24, 64.27, 66.67; 105/197 B, 164

[56] References Cited

U.S. PATENT DOCUMENTS

| | | | |
|---|---|---|---|
| 2,443,433 | 6/1948 | Sanmori | 280/711 |
| 2,848,248 | 7/1958 | Hansen et al. | 280/711 |
| 3,154,318 | 10/1964 | Hutchens | 280/104 |
| 3,201,141 | 7/1965 | Bernstein et al. | 280/683 |
| 3,290,056 | 12/1966 | Smith | 280/711 |
| 3,475,015 | 10/1969 | Hirst | 267/64.24 |

Primary Examiner—Joseph F. Peters, Jr.
Assistant Examiner—Mitchell J. Hill
Attorney, Agent, or Firm—Seed and Berry

[57] ABSTRACT

A plurality of interconnected air bag assemblies suspend a frame above a vehicle axle or similar support member to provide a low vertical spring rate and a high roll spring. The air bag assemblies comprise a pair of air bags and a piston suspended therebetween. In one preferred embodiment a net effective area which decreases with upward movement of the piston combines with an air bag interconnection system to provide the desired spring rates. Alternate embodiments use offset connection in place of, or in conjunction with the tapered pistons. The air bag assemblies of tandem axles are interconnected to provide equalization in a preferred embodiment.

16 Claims, 16 Drawing Figures

SWAY BAG SUSPENSION SYSTEM

DESCRIPTION

1. Technical Field

This invention relates to a suspension system for vehicles or the like, and more particularly, to such systems using interconnected pairs of pneumatic elements to provide a high roll spring rate and a low vertical spring rate.

2. Background Art

Two basic functions of any vehicle suspension system are to isolate the vehicle from sudden vertical changes and to stabilize the vehicle when it is subjected to tipping or rolling moments. For heavy-duty vehicles, such as large trucks, it is desirable to provide a suspension system having (1) a low vertical spring rate to isolate the vehicle from bumps and holes in the roadway, and (2) a high roll spring rate to counteract the tipping moments which might otherwise result in the truck rolling over. To provide a stiff roll spring capability and a soft vertical spring capability in such suspension systems, it has been necessary, in the past, to provide separate mechanical elements. A soft vertical spring rate has preferably been provided by "soft" pneumatic springs designed to provide a low vertical spring rate. Unfortunately, such soft vertical springs result in a low spring rate and tend to encourage rollover. Consequently, sway bars are employed to provide high roll stability when soft vertical springs are used. As an alternative to using separate mechanical elements, many manufacturers choose to use single elements which provide mediocre vertical and spring roll capabilities.

Suspension systems for heavy duty vehicles employing tandem axles will sometimes include equalizing beams in addition to the two elements discussed above. An equalizing beam is basically a beam coupled at each end to one of the tandem axles and pivotally connected to the vehicle frame near its midpoint by a pinned joint. It functions to evenly distribute loads between the axles and to reduce the deflection of the vehicle chassis when one of the axles is deflected. Equalizers are desirable, but are omitted in some suspension systems to reduce the cost of the system.

A desirable suspension system for a heavy duty vehicle having tandem axles has thus required, until now, three independent elements to provide a smooth ride and adequately stabilize the vehicle—vertical springs, sway bars and equalizing beams. Such as system is undesirable in that the multiple elements occupy space in an often already crowded environment and add additional weight to the vehicle.

As noted above, pneumatic springs are commonly used in heavy vehicle suspension systems as vertical springs. Such springs comprise a single air bag which is interposed between the vehicle chassis and a piston. The piston is coupled to the axle. When the air bags are pressurized, fluid within the bags will act on the piston to support the vehicle chassis above the axle. The area over which the pressurized fluid acts vertically on the piston is known as "the effective area," designated $A_E$ herein. When the axle is forced upward relative to the vehicle chassis, the resulting upward motion of the piston is opposed by the pressurized air within the air bag, causing the air bag to act as a vertical spring.

Efforts to provide suspension systems using pneumatically coupled devices such as air bags have until now produced systems which were unacceptable for heavy vehicles or the like which require a low vertical spring rate and a high roll spring rate. A patent to Sanmori, U.S. Pat. No. 2,443,433, discloses a system having a plurality of pistons suspended between upper and lower air bags. As this system utilizes air bags having an effective area which increases with compressive displacement, a remote air reservoir is required to provide a low vertical spring rate. (See discussion below regarding variable effective areas.) Additionally, the Sanmori system does not provide adequate roll protection for heavy duty vehicles or include any equalization functions. A Russian patent, No. 408,835, discloses another system utilizing pneumatically coupled elements. These elements, however, have a constant effective area, and the system consequently does not provide acceptable vertical spring and roll spring capability from a set of single devices.

DISCLOSURE OF THE INVENTION

It is an object of this invention to provide a single device for use in a vehicle system which will provide both roll spring and vertical spring capability to the system.

It is another object of this invention to provide such a device which can additionally perform the function of an equalizing beam when used on a suspension for a vehicle having tandem axles.

It is another object of this invention to provide such a device which is relatively lightweight and does not require an undue amount of space on the vehicle.

It is another object of this invention to provide a suspension system for a vehicle or the like which will provide a low vertical spring rate and a high roll spring rate.

It is another object of this invention to provide such a system which will provide such spring rates without the need for remote air reservoirs.

It is another object of this invention to provide such a system which will additionally provide equalization capacity.

These and other objects which will become more apparent as the invention is more fully described below are obtained by providing a suspension system which, in a preferred embodiment, utilizes a plurality of interconnected air bag assemblies interposed between the vehicle chassis and the left and right side of an axle to suspend the chassis above the axle and provide the vertical spring, roll spring and equalization capabilities necessary for a heavy duty vehicle or the like.

One group of preferred embodiments utilizes "stacked" air bag assemblies. Each stacked air bag assembly comprises an upper air bag, a lower air bag, and a piston suspended therebetween. In one preferred embodiment, the upper and lower air bags of each assembly are attached to the chassis and the piston is coupled to a corresponding axle for vertical movement therewith. Movement of the axle relative to the chassis will move the piston within the two air bags, compressing one bag and expanding the other. This compression and expansion of the bags will produce pressure changes within the air bags, and vary the forces exerted on the piston by the pressurized fluid in each bag. A specially tapered piston combines with the pneumatic interconnection system to deliver a high roll spring rate and low vertical spring rate for these varying forces.

Additional preferred embodiments of the invention utilize "unstacked" air bag assemblies. The air bags of these assemblies are spaced apart from one another and need not be vertically aligned. An elongated piston member extends between the air bags of each assembly. The piston member is preferably pivotally mounted to the vehicle frame to enable different lever arms to be used for the "upper" and "lower" air bags, thereby allowing air bags of the same size to provide different net reactive forces.

One preferred embodiment utilizes unstacked air bags which are connected to the vehicle frame and a piston member by pinned connections which are offset from one another. When one of the air bags is compressed due to movement of the piston member, the air bag will become oriented at a new angle with respect to the piston member such that the component of the resultant force of the pressurized fluid within the air bag which opposes the compression of the air bag will decrease with increased compression of the air bag. The result will be to counteract the pressure increase, using a straight piston.

Alternative embodiments for use on tandem axle vehicles additionally perform the function of an equalizing beam. These embodiments include an interconnected set of air bag assemblies for each of the tandem axles.

BEST MODE FOR CARRYING OUT THE INVENTION

Figure 1:
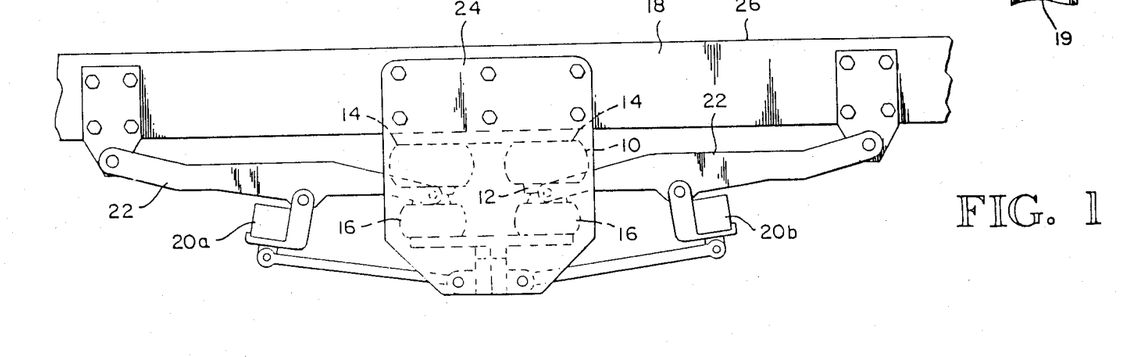
FIG. 1 is a side elevation view illustrating a pair of air bag assemblies mounted on one side of a tandem axle vehicle.
Figure 2:
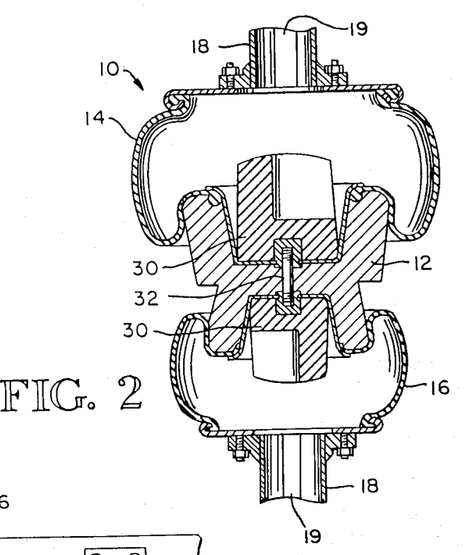
FIG. 2 is a front elevation view of an air bag assembly broken away to illustrate the interior of the air bag assembly.

A preferred embodiment of a stacked air bag assembly 10 in accordance with the present invention is illustrated in FIG. 2. A piston 12 is suspended between an upper air bag 14 and a lower air bag 16. Each of the air bags is mounted to the vehicle chassis 18, and the piston is coupled to one side of an axle of the vehicle. (FIG. 1 illustrates two air bag assemblies coupled to respective axles 20a, 20b.) When the air bags are pressurized, they suspend the vehicle frame above the axle such that movement of the axle relative to the chassis will be cushioned by the air bags.

An air bag assembly such as the one illustrated in FIG. 2 is placed between the vehicle chassis and the axle on each side of the chassis. The air bag assemblies include a variable effective area piston and a special interconnecting network to provide the desied low vertical spring rate and high roll spring rate.

As the piston 12 is coupled to the axle for vertical movement, it will move up and down between the air bags as the axle moves relative to the chassis. As seen in FIG. 2, the air bags are each fixed to the vehicle chassis 18 and are therefore expanded and compressed as the piston moves between them. Ports 19 at the top and bottom ends of the air bag assembly extend through the chassis to allow pressurized fluid to enter the air bags and to enable fluid communication between the air bag assemblies as described below. The piston preferably includes a bump-stop 30 projecting outwardly from its top and bottom ends. The bump-stop is fabricated of resilient material and will engage the air bags at the chassis when the suspension bottoms out. In the embodiment illustrated in FIG. 2, the bump-stops are secured to the piston by a common bolt 32 which extends through the piston. For ease in assembly and maintenance, the piston may be formed of an upper piece and a lower piece which are also held together by the bolt 32.

Figure 5:
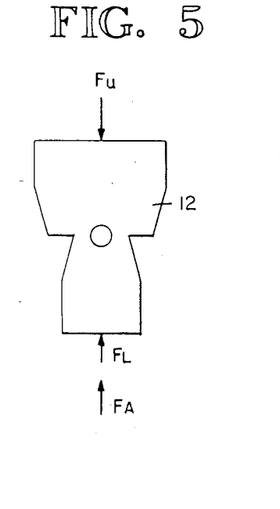
FIG. 5 is a free-body diagram illustrating the forces acting on a piston suspended between two air bags.

This invention can best be understood by first examining the functioning of an individual air bag assembly. The following discussion will focus on the functions of a stacked air bag assembly. The analogous functioning of various nonstacked embodiments will be described later. The piston is suspended between the two air bags and has three external forces acting on it in the vertical direction. As illustrated in FIG. 5, the piston will receive (1) an upward force $F_A$ transmitted from the axle to the piston; (2) an upward force $F_L$ exerted on the piston by the pressurized fluid in the lower air bag; and (3) a downward force $F_U$ exerted on the piston by the pressurized fluid in the upper air bag.

Under static conditions, $F_A$ will equal the proportional share of the vehicle weight which is supported by the air bag assembly in question. $F_U$ and $F_L$ are functions of the fluid pressure in the air bags times the effective area over which the fluid pressure acts vertically. As a fluid exerts pressure on a surface with which it is in contact at an angle perpendicular to such surface, the vertical forces $F_U$, $F_L$ exerted on a tapered piston will not be a function of the entire area of contact between the fluid and the piston, but rather will be a function of some lesser area, termed the "effective area" ($A_E$) herein. Under static conditions, the upper and lower air bags are pressurized to a common initial pressure $P_O$ to support the static load of the vehicle. Thus, under initial static loading conditions, the forces acting on the piston are given by the following equations:

$$F_A = wt/c, \tag{1}$$

where wt=vehicle load; and c=constant reflecting proportional share of vehicle load carried by the air bag assembly $$F_U = P_O \times A_{E(upper)} \quad (2)$$

$$F_L = P_O \times A_{E(lower)} \quad (3)$$

As the summation of vertical forces acting on the piston must equal zero, we know that:

$$F_A = F_U - F_L; \text{ or substituting equations 2 and 3} \quad (4)$$

$$F_A = P_O(A_{E(upper)} - A_{E(lower)}) = P_O A_{E(net)} \quad (5)$$

Examining equation 5, it can be seen that to support a given static load $F_A$, an air bag assembly must have a larger effective area between the upper air bag and the piston ($A_{E(upper)}$) than between the lower air bag and the piston ($A_{E(lower)}$). How large this difference must be will be a function of the initial pressure $P_O$ which is used. This difference is accomplished by making the upper air bag and corresponding piston contact surface larger than the lower air bag and its corresponding piston contact surface. Referring momentarily to the preferred embodiment illustrated in FIG. 2, it can be seen that the upper air bag 14 and upper portion of the piston 12 are larger than the lower air bag 16 and lower portion of the piston.

Under dynamic conditions, the force $F_A$ transmitted to the piston by the axle will vary. It can vary either because external forces are transmitted to the axle as the vehicle encounters a bump, for example, or because the proportional share of the vehicle weight supported by one particular air bag assembly changes, such as when the vehicle travels around a curve.

Figure 6A:
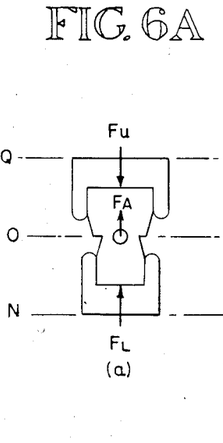
FIGS. 6A and 6B are schematic illustrations of a single air bag under static loading and when subjected to an uplifting force, respectively.

The effects on an air bag assembly due to an increase in $F_A$ (caused by an external uplifting force) are illustrated in FIG. 6. FIG. 6a shows the piston suspended between the upper and lower air bags in a static loading condition, with the center of the piston located at line O, the upper air bag fixed to the vehicle chassis at line Q, and the lower air bag fixed to the vehicle chassis at line N.

Figure 6B:
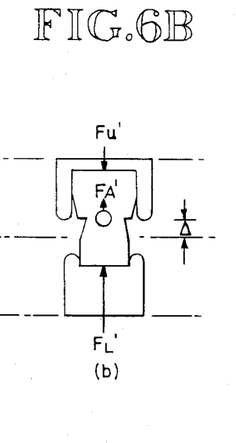

FIG. 6b illustrates the same air bag assembly when the axle to which it is coupled is subjected to an external uplifting force. The force transmitted to the piston from the axle has increased to a new value $F_A' > F_A$. The instantaneous effect of this increase is to displace the piston vertically upward. Referring to FIG. 6b, it can be seen that the center of the piston has moved a distance $\Delta$ above its initial position at line O. As the outer end of the upper air bag is fixed to the vehicle chassis (at line Q in FIG. 6b), upward displacement of the piston will compress the upper air bag and decrease its total volume. Similarly, the lower air bag will be expanded and its volume increased. Note that as the upper air bag must be larger than the lower air bag, its volume will decrease more than the volume of the lower air bag increases.

A change in the volume of a closed system in which a fluid is contained will result in an inverse change in the pressure of the fluid within the system. If we assume, for the purposes of explanation, that the upper air bag and lower air bag each represent a closed system (and are, therefore, *not* connected to any other air bag in the suspension system), the new pressure p in each air bag after its volume has changed can be determined by an equation of the general form:

$$P_T = P_O(V_O/V_T)^K$$

where:
  $V_O$ = the initial volume of the air bag;
  $P_O$ = the initial pressure of the fluid within the air bag;
  $V_T$ = the new volume of the air bag;
  K = a constant dependent upon temperature changes in the fluid. K = 1.0 for isothermal processes.

The value of K in equation (6) will remain greater than 1.0 for all cases concerned here, and may, in fact, obtain values in the range of K = 1.38 during rapid deflection of the piston. It can be seen from equation (6), then, that a decrease in the volume of the upper air bag, as illustrated in FIG. 6b, will increase the pressure in the bag by an amount greater than the inverse ratio of the volume change. This increased pressure will correspondingly increase the force of the pressurized fluid in the upper air bag acting downward on the piston to a value $F_U' > F_U$. The value of $F_U'$ is given by the following equations:

$$F_U' = P_{T1} \times A_{E(upper)}$$

where $P_{T1} = P_T$ for upper bag; or $$F_U' = P_O(V_O/V_T)^K \times A_{E(upper)}$$

Similarly, the force acting upward on the piston as a result of the pressurized fluid in the lower air bag will equal $F_L' > F_L$, where:

$$F_L' = P_{T2} \times A_{E(lower)}$$

where $P_{T2} = P_T$ for lower bag; or $$F_L' = P_O(V_O/V_T)^K \times A_{E(lower)}$$

The changes in $F_L$ and $F_U$ due to pressure changes enable the air bag assembly to function as a vertical spring. As seen in the preceding explanation, when the piston moves upward, pressurized fluid within the air bag assembly opposes such motion as reflected by the increase in $F_U$ and the decrease in $F_L$.

If the effective areas $A_{E(lower)}$ and $A_{E(upper)}$ of the air bags on the piston were to remain constant with vertical displacement of the piston, the air bag assembly would function as a vertical spring with a high vertical spring rate. The pressure in the compressed air bag rises quickly and creates a relatively large force to oppose vertical displacement of the piston, as seen in the general equation:

$$F' = P_T A_E$$

where:
  F' = force of the air bag opposing vertical displacement of the piston;
  $P_T$ = pressure in that air bag (see equation 6);
  $A_E$ = effective area over which the pressurized fluid in that air bag acts on the piston.

To provide a low vertical spring rate, it is necessary to reduce F'. This reduction is accomplished in some preferred embodiments by providing a piston which is configured to yield a value for $A_E$ which decreases when $P_T$ increases. In the preferred embodiment of FIGS. 1 and 2, for example, the piston 12 is tapered, as seen in FIG. 2, such that upward displacement of the piston results in a decrease in $A_{E(net)}$, the net effective area of the upper and lower bags ($A_{E(net)} = A_{E(upper)} - A_{E(lower)}$). Alternate methods of tapering are discussed in more detail below. It should be noted that the tapering required to achieve a very low spring rate in this manner is believed to be too extreme to be practical, and reducing the vertical spring rate in this manner decreases the roll spring rate proportionately.

(ii) System Using Two Stacked Air Bag Assemblies

Figure 3:
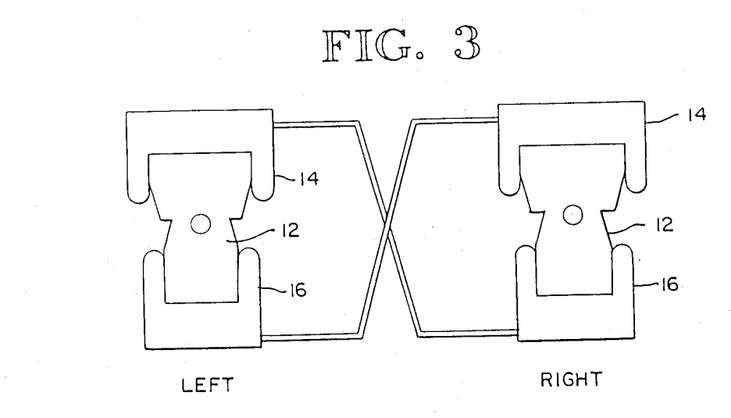
FIG. 3 is a schematic view illustrating the air bag connections for a single axle arrangement.

The discussion thus far has focused on the function of a single air bag assembly and assumed that each air bag within the assembly was a closed system. In the preferred embodiments of the invention, however, the air bag asemblies of each axle are selectively interconnected to provide the desired vertical and roll spring characteristics. As illustrated in FIG. 3, the left lower air bag is in fluid communication with the right upper air bag, and the left upper air bag is in fluid communication with the right lower air bag.

Figure 7A:
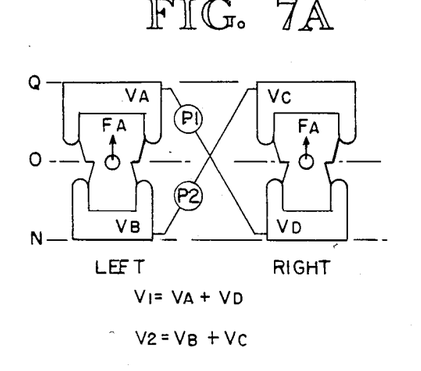
FIG. 7A is a schematic illustration of two interconnected air bags for a single axle under static loading conditions.
Figure 7B:
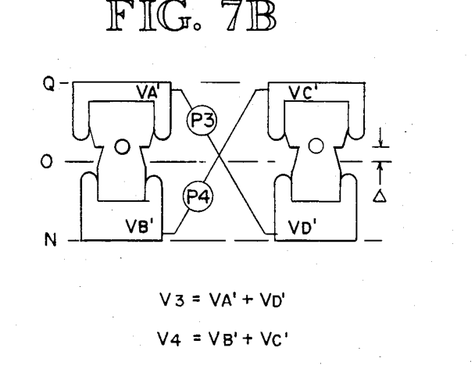
FIG. 7B is a schematic illustration of the air bag assemblies of FIG. 7A subjected to an uplifting force.
Figure 7C:
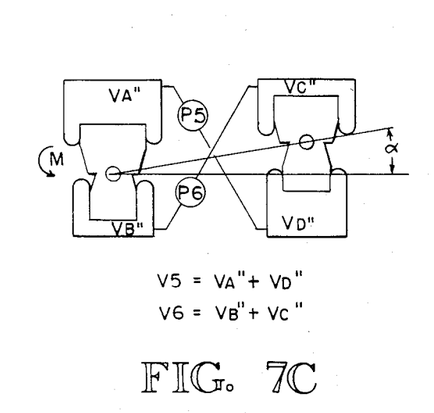
FIG. 7C is a schematic illustration of the air bag assemblies of FIG. 7A subjected to a tipping moment.

The operation of a suspension system comprising two air bag assemblies positioned on the left and right side of an axle is illustrated schematically in FIGS. 7A–C. FIG. 7A shows the system in a static condition. A first chamber is made up of the upper left and lower right air bags, contains fluid at pressure P, and has a volume equal to $V_1$. A second chamber is made up of the lower left and upper right air bags, contains fluid at pressure $P_2$, and has a volume equal to $V_2$. Under static loading conditions, the chambers are pressurized to a common pressure $P_O$ so that $P_1 = P_2 = P_O$. The proportional share of the vehicle weight which is supported by the axle will be twice the value of $F_A$ (see equation 1), and $F_A = P_O A_{E(net)}$ (equation 5).

VERTICAL SPRING CASE

FIG. 7B represents the system of FIG. 7A after the axle has encountered an uplifting force which raises both pistons by an amount designated as $\Delta$. In this situation, the air bag assemblies are functioning purely as vertical springs. The upward movement of the pistons will compress each of the upper air bags and consequently reduce the volume of the upper bags $V_A$ and $V_C$. Similarly, the volume of the lower air bags $V_B$ and $V_D$ will be increased. This increase in volume will be less than the decrease in volume of the upper bags, as the upper bags are necessarily larger than the lower bags (see equation 5 and discussion following). The total volume in each chamber, $V_1$ and $V_2$, will consequently decrease, causing a pressure increase in each chamber given by the following equations in the form of equation 6:

$$P_3 = P_1 (V_1/V_3)^K \quad (12)$$

$$P_4 = P_2 (V_2/V_4)^K \quad (13)$$

As $P_1 = P_2$, $V_1 = V_2$, and $V_3 = V_4$ (where each piston deflects a common amount $\Delta$), we know that:

$$P_3 = P_4$$

The net downward force ($F_U - F_L$) for each piston will thus be:

$$F_U - F_L = P_3(A_{E(upper)} - A_{E(lower)}) = P_3(A_{E(net)}) \quad (14)$$

As $A_{E(net)}$ is a function of the vertical displacement of the piston, equation 14 can be rewritten as:

$$F_U - F_L = f(\Delta) \cdot P_3 \quad (15)$$

where $f(\Delta)$ is a function describing the change in $A_{E(net)}$ with piston deflection.

The piston may be tapered to produce the desired spring constant. If $f(\Delta)$ varies inversely with the pressure $P_3$, the force opposing upward movement of the piston ($F_U - F_L$) will remain constant with stroke, yielding a vertical spring rate equal to zero. While such a spring rate is lower than desirable, a less drastic result can be obtained by tapering the piston to decrease $A_{E(net)}$ at a rate slower than the pressure increase (see equations 12 and 13). Thus, by tapering the piston in relation to the pressure increases which occur due to vertical displacement, one can select the amount of force which will oppose vertical displacement of the piston, thereby selecting the stiffness level desired for the vertical spring.

(b) Roll Spring Case

FIG. 7C illustrates the system of FIG. 7A acting as a roll spring. A counterclockwise tipping moment M has been applied to the system. This tipping moment M will lower the left piston and raise the right piston, thus increasing the volume $V_5$ of the first pair of chambers and decreasing the volume $V_6$ of the second pair of chambers. The pressure in the chamber pairs will be:

$$P_5 = P_1 (V_1/V_5)^K; \text{ and} \quad (16)$$

$$P_6 = P_1 (V_2/V_6)^K \text{ (Note:} P_2 = P_1) \quad (17)$$

Note that $P_6$ will be greater than the original system pressure $P_1$ as both air bags in the second pair of chambers are compressed, and $V_2/V_6 > 1.0$. Similarly, $P_5$ will be less than $P_1$ as both air bags in the first chamber experience an increase in volume, and $V_1/V_5 < 1.0$.

Figure 7D:
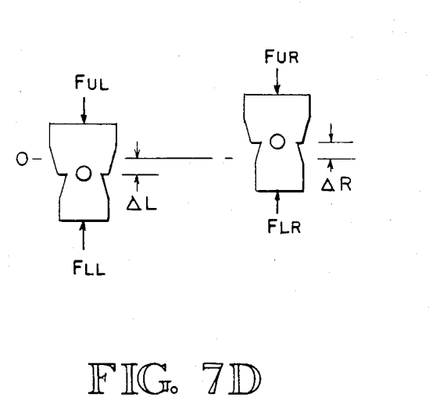
FIG. 7D is a free-body diagram illustrating the forces acting on the piston of FIG. 7C.

The free-body diagram of FIG. 7D illustrates the forces exerted on the piston by the air bags. The values of these forces will be:

$$F_{UL} = P_5[A_{E(upper)} \text{ for deflection } = -\Delta L] \quad (18)$$

$$F_{LL} = P_6[A_{E(lower)} \text{ for deflection } = -\Delta L] \quad (19)$$

$$F_{UR} = P_6[A_{E(upper)} \text{ for deflection } = \Delta R] \quad (20)$$

$$F_{LR} = P_5[A_{E(lower)} \text{ for deflection } = \Delta R] \quad (21)$$

The tipping moment is reacted by increases in $F_{UR}$ and $F_{LL}$ due to $P_6$ being greater than $P_2$, and the decreases in $F_{LR}$ $F_{UL}$ due to $P_5$ being less than $P_1$. $P_6$ is greater than $P_2$ because $V_6$ is less than $V_2$, and $P_5$ is less than $P_1$ because $V_5$ is greater than $V_1$.

It should be noted that the values of $A_E$ in equations 18–21 may vary with the piston deflection $\Delta$. These variations will tend to decrease the roll spring rate, but their effect is outweighed by the favorable pressure increases. $A_{E(net)}$, as noted earlier, may be varied by (1) making $A_{E(upper)}$ vary (i.e., tapering the upper portion of the lower portion of the piston); or (3) varying both $A_E$ (upper) and $A_{E(lower)}$.

(c) Equalization Case

Figure 4:
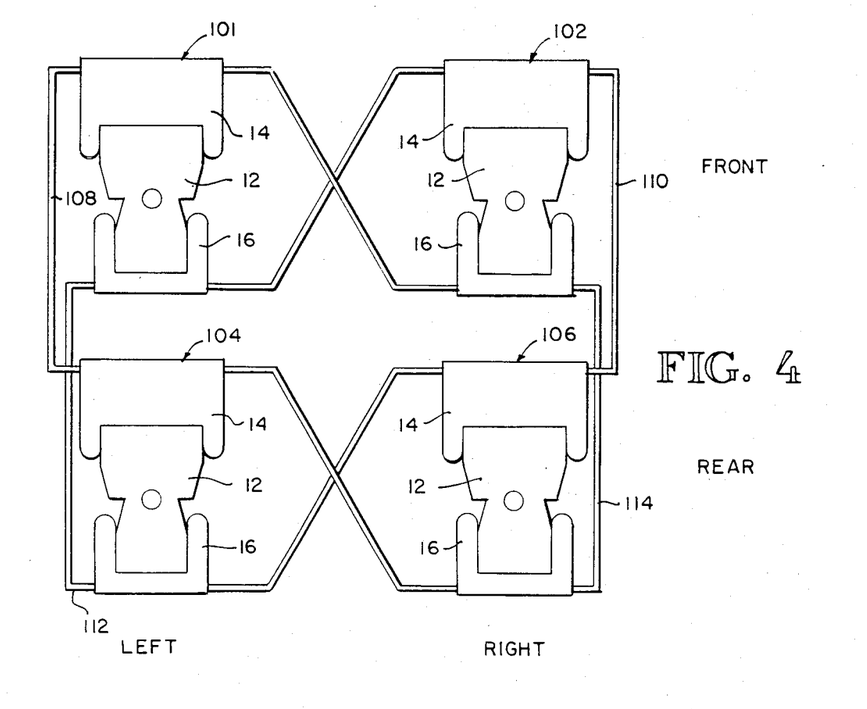
FIG. 4 is a schematic view illustrating the air bag interconnections for a tandem axle arrangement.

When a stacked air bag suspension system in accordance with the present invention is employed on a vehicle having tandem axles, it is preferred that the air bag assemblies of the tandem axles be interconnected to provide equalization between the tandem axles. FIG. 4 illustrates the air bag connections in such a system. A first pair of air bag assemblies 101, 102 suspend the vehicle chassis above the front axle of the tandem pair, while a second pair of air bags assemblies 104, 106 suspend the chassis above the rear axle. As illustrated in FIG. 4, each of the assemblies is interconnected with the other assembly of the same axle in the same manner as described above and illustrated in FIG. 3. Roll and vertical spring capabilities are thus provided in the same manner as described above. In addition to the connections, each air bag is placed in fluid communication with a correspondingly located air bag on the other axle. Thus, the left upper air bag of the front axle is connected to the left upper air bag of the rear axle by fluid line 108. Similarly, three additional fluid lines 110, 112, 114 connect the other corresponding pairs. The interaxle air bag connections will result in common pressures in corresponding air bags. As the effective area $A_E$ over which the pressures act on the piston will be substantially equal (slight variations may exist if the pistons are not at identical elevations) and the pressures P are equal, the the forces $F_A$ transmitted through each air bag assembly to the axle will be substantially equal $(F_A = P \cdot A_E)$. Thus, the interaxle connections will serve to equalize the load on each of the tandem axles.

FIG. 1 illustrates the air bag assemblies utilized on a vehicle having tandem axles 20a, 20b. A mounting bracket 24 depends from the frame rail 26 of the vehicle chassis to support the lower air bags 16, as seen in FIG. 1. A coupling arm 22 connects each axle to the piston 12 of its respective air bag assembly 10. The air bag assemblies for the front axle 20a and rear axle 20b of the tandem pair are interconnected as shown in FIG. 4 to provide equalization between the two axles.

For single axle embodiments, the air bag assemblies may be secured to the vehicle in the same manner illustrated in FIG. 1. Equivalent alternatives may also be employed.

ALTERNATIVE EMBODIMENTS (iii) Reversing air bag and piston connections

Although embodiments of the invention discussed thus far couple the piston to the axle and connect the air bags to the chassis, this relationship could obviously be reversed. The invention therefore includes embodiments wherein the air bags are coupled to an axle for vertical movement therewith and the piston is connected to the chassis.

(iv) Systems Using Unstacked Air Bag Assemblies

Figure 8:
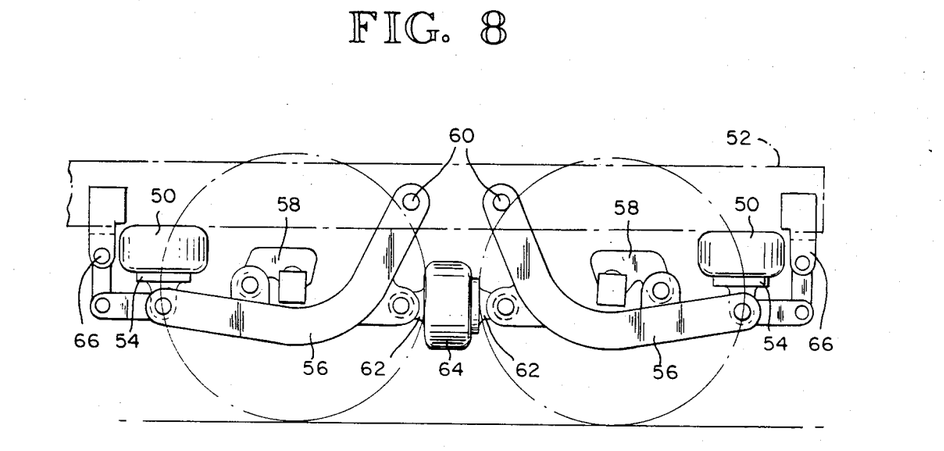
FIG. 8 is a side elevation view of an unstacked air bag assembly for use on one side of a pair of tandem axles.

Additional alternate preferred embodiments of the invention utilize unstacked air bag assemblies. FIG. 8, for example, illustrates a unstacked assembly designed for use with tandem axles. For each axle there is a corresponding "upper" air bag 50 mounted to the vehicle frame 52. The lower portion of each "upper" bag is engaged by a piston piece 54 which forms part of an elongated piston member 56. Each piston member is coupled to its respective axle by a connecting member 58 and pivotally mounted to the vehicle frame by a pivotal connection 60. A "lower" piston piece 62 is mounted on each piston member. Each "lower" piston piece engages a common "lower" air bag 64 which performs the function of the lower air bag. (The piston pieces 54 which engage "upper" air bags are preferrably connected to lateral stabilizing assemblies 66 as seen in FIG. 8). The axles are prevented from rotating by upper torque rods (not shown) connected to the frame 52.

In operation, when the axles are deflected upwardly, the piston members will pivot about the corresponding pivotal connection 60. The "upper" air bag and "lower" air bag are each positioned such that the force of the pressurized air in the bags will act with different leverage. As can be seen in FIG. 8, the lever arm of the "lower" air bag is shorter than the lever arm of the "upper" air bag. Referring back to the stacked air bag assemblies, it is remembered that in order to support the vehicle it was necessary that the lower air bag be smaller than the upper air bag. In the assembly of FIG. 8, this requirement is eliminated by using different leverage. Thus, it is possible to use the same size bags for the "upper" and "lower" bag.

Figure 9:
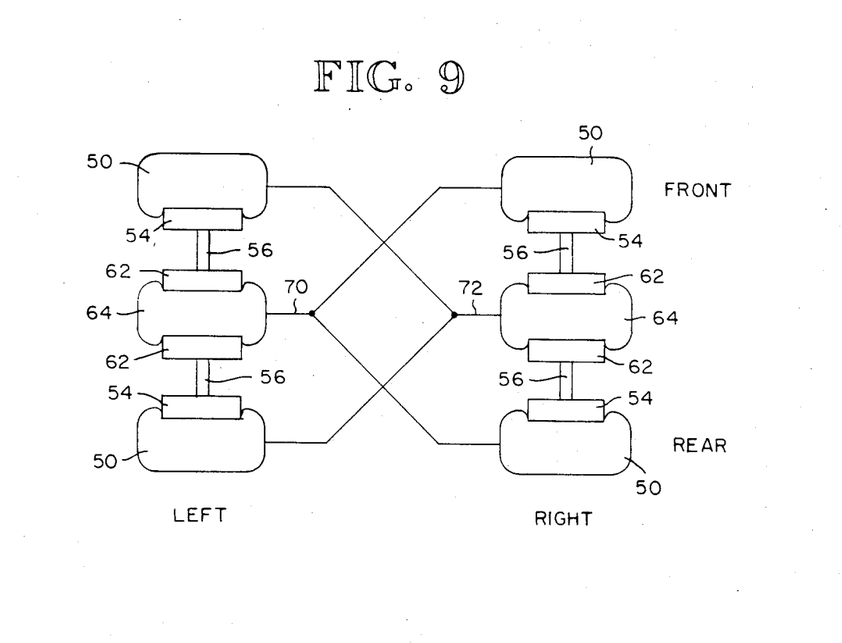
FIG. 9 is a schematic illustration of the air bag interconnections for two air bag assemblies such as the one shown in FIG. 8 positioned on each side (left and right) of a pair of tandem axles.

FIG. 9 illustrates the air bag interconnections for air bag assemblies such as the one illustrated in FIG. 8 positioned on both the left and right side of a vehicle. The interconnection is done in the same manner as the tandem assemblies illustrated in FIG. 4, although a common "lower" air bag is used on the left and right sides of the vehicle. Thus, the "upper" air bags 50 on the left side are placed in fluid communication with the right side "lower" bag 64 by a system of air lines 70. Similarly, the right "upper" bags 50 are in fluid communication with the "lower" left bag by a system of air lines 72. Each air line system 70,72 includes a conventional supply means (not shown) for supplying pressurized air to the bags and conventional leveling valves (not shown).

Although the air bag assembly illustrated in FIG. 8 utilizes a common "lower" air bag for ech of the tandem axles, alternate embodiments can include separate "lower" bags if desired. For single axle unstacked air bag assemblies, a mounting bracket (not shown) or the equivalent will depend from the frame to support the side of the air bag opposite the piston piece. For such single axle embodiments, the air bags will be interconnected in the same manner as for single axle stacked combination, i.e. "upper" left to "lower" right and "lower" left to "upper" right.

Figure 10:
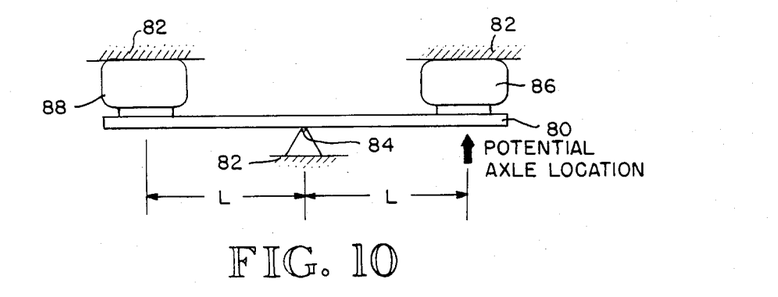
FIGS. 10 and 11 are schematic illustrations of various unstacked air bag assemblies.
Figure 11:
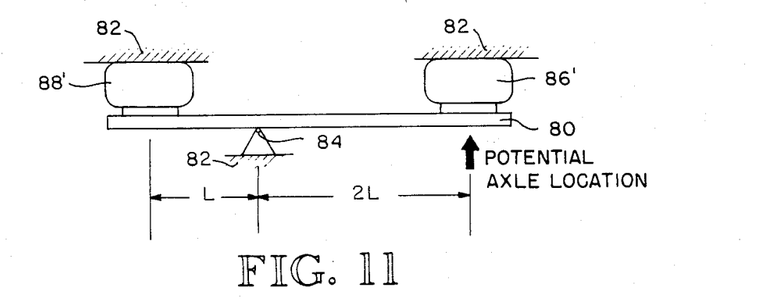
Figure 12:
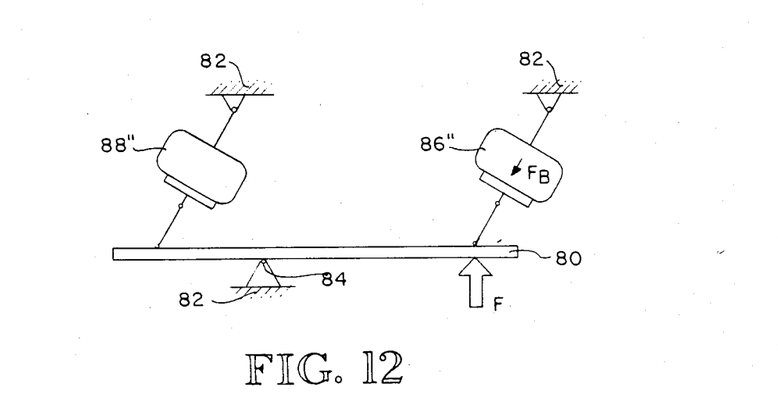
FIG. 12 is a schematic illustration of an unstacked air bag assembly utilizing pinned air bag connections to provide a lever arm which varies in leverage with the deflection of the piston member.

FIGS. 10, 11, and 12 illustrate the functioning of various unstacked air bag assemblies for single axles. FIG. 10 illustrates an assembly using a piston member 80 which is pivotally connected to the vehicle frame 82 by connection 84. An "upper" air bag 86 and a "lower" air bag 88 are each positioned at equal distances L from the pivotal connection. Such an arrangement will function well, although it will be necessary, as in the stacked air bag embodiment, that the "lower" bag be sized smaller than the upper bag.

FIG. 11 illustrates an embodiment where the "upper" bag 86' has twice as much leverage as the "lower" bag 88'. Thus, assuming the proper initial pressure in the bags, the bags can be the same size and still support the vehicle.

FIG. 12 illustrates an embodiment similar to that of FIG. 11. In this embodiment, however, the air bags 88", 86" are connected to the frame 82 by a pinned connection. The pinned connections are offset from one another such the air bags are in an inclined position with respect to the piston member. The inclination of the air bags will increase as they are compressed thereby decreasing the component of the resultant force with which air bag which acts perpendicular to the piston member to oppose compression of the air bag. The result of this decrease is to counteract the effects of increased pressure within the bags which results from compression and allows a soft vertical spring rate. For example, when a force F is applied to the air bag assembly as illustrated in FIG. 12, it will tend to compress the "upper" air bag 86". As the right hand side of the piston member 80 pivots upwardly, the air bag will also pivot such that it is at a greater angle (further from the vertical). Thus, the vertical component of the force $F_B$ of the pressurized air within the air bag will decrease as the piston member is deflected upwardly. It can be seen then that mechanical means such as illustrated in FIG. 12 can be used to obtain the same effect as a tapered piston.

It has been found that offsetting the air bag connections such that the air bags are inclined in the range of 20°–30° (from the vertical in FIG. 12) produces favorable results. Lesser amounts are acceptable but may not provide as soft a vertical spring as desired. It may be desired to combine the offset with tapered pistons to produce an air bag assembly with the desired force/deflection curve. At large angles of offset, undesirable results will occur in that the slope of the force/deflection curve will become a negative for certain deflections.

(v) Although the invention has been described herein with respect to particular embodiments thereof, it is understood that the invention is not limited to these embodiments and could be utilized in other vehicle and nonvehicle environments where a low vertical spring rate and high roll spring rate are desired. Additionally, although the disclosure and claims herein refer frequently to air bags, it is understood that other fluid chambers or pneumatic devices could be employed to obtain the results described herein, and use of the term "air bag" is consequently for convenience and not intended as a limitation of the scope of the invention. It is intended, therefore, that the invention not be limited to the specific embodiments disclosed herein, but rather include all equivalent embodiments which are within the spirit of the invention.

I claim:

1. An air bag assembly for use in a vehicle suspension system utilizing a plurality of air bag assemblies to suspend a vehicle chassis above a plurality of transversely spaced wheels, the air bag assembly comprising:
    a piston member including means for coupling the piston member to a corresponding wheel for movement therewith such that the piston member will be displaced when the wheel moves relative to the chassis;
    a first air bag engaging the piston member for compression thereby when the piston member is displaced by movement of a corresponding wheel toward the chassis, the first air bag being inflatable with pressurized fluid, to produce an opposing force which resists compression of the air bag by the piston member;
    a second air bag engaging the piston member for compression thereby when the piston member is displaced by movement of its corresponding wheel away from the chassis, the second air bag being inflatable with pressurized fluid, to produce an opposing force which resists compression of the air bag by the piston member;
    means for limiting the combined values of the opposing force of the first air bag and the opposing force of the second air bag such that the combined value will not increase to the extent otherwise occurring as the result of fluid pressure increases which occur during compression of an air bag; and
    means for interconnecting the first air bag and the second air bag with the air bags of other air bag assemblies within the system.

2. The assembly of claim 1 wherein the limiting means comprises a tapered outer surface on the piston.

3. The assembly of claim 1 wherein the limiting means comprises offset connections between the air bags and their pistons and chassis such that the angle between the pistons and air bags increases as the air bag is compressed, thereby causing the component of the resultant force of the pressurized fluid within the air bags, which opposes movement of the wheel, to decrease relative to the total resultant force as the air bags are compressed.

4. The assembly of claim 3 wherein the limiting means additionally includes a tapered outer piston surface.

5. An air bag assembly for use in a vehicle suspension system utilizing a plurality of air bag assemblies to suspend a vehicle chassis above a plurality of transversely spaced wheels, the air bag assembly comprising:
    a piston member including means for coupling the piston member to a corresponding wheel for movement therewith such that the piston member will be displaced when the wheel moves relative to the chassis;
    a first air bag engaging the piston member for compression thereby when the piston member is displaced by movement of a corresponding wheel toward the chassis, the first air bag being inflatable with pressurized fluid, to produce an opposing force which resists compression of the air bag by the piston member;
    a second air bag engaging the piston member for compression thereby when the piston member is displaced by movement of its corresponding wheel away from the chassis, the second air bag being inflatable with pressurized fluid, to produce an opposing force which resists compression of the air bag by the piston member;
    means for limiting the combined values of the opposing force of the first air bag and the opposing force of the second air bag such that the combined value will not increase to the extent otherwise occurring as the result of fluid pressure increases which occur during compression of an air bag;
    means for interconnecting the first air bag and the second air bag with the air bags of other air bag assemblies within the system; and
    the piston member being pivotally mounted to the chassis, thereby enabling the first air bag and the second air bag to engage the piston member at spaced-apart locations on the piston member to allow their respective opposing forces to act over different leverages.

6. The assembly of claim 5 wherein the first air bag and the second air bag are substantially the same size.

7. A suspension system for a vehicle having a chassis and transversely spaced wheels supporting the chassis, which comprises:
    right and left air bag means, each including
        a first air bag;
        a second air bag; and
        a piston member having a first surface extending into the first air bag and a second surface extending into the second air bag;
    means for coupling the right and left air bag means to the chassis and respective transversely spaced wheels such that vertical displacement of the chassis relative to the wheels will result in compression of one air bag within the air bag means and expansion of the other;

means for varying the resultant force which opposes upward movement of the wheels with respect to the vehicle chassis such that the resultant force increases less rapidly than would otherwise be dictated by increased pressure within the air bag; and means for interconnecting the left and right air bag means such that the first air bag of the left air bag means and the second air bag of the right air bag means are in fluid communication, and the second air bag of the left air bag means and the first air bag of the right air bag means are in fluid communication.

8. The suspension system of claim 7 wherein the varying means comprises a tapered piston.

9. The suspension system of claim 7, further including a second set of right and left air bag means, coupling means and varying means corresponding to a second axle used on the vehicle in tandem with the first axle, the suspension system further including equalizing connections between the two right and two left air bag means such that the first air bag and the second air bag of each air bag means are in fluid communication with the corresponding first and second air bag means of the second set.

10. A suspension system for a vehicle having a chassis and transversely spaced wheels supporting the chassis, which comprises:

right and left air bag means, each including
a first air bag;
a second air bag; and
a piston member having a first surface extending into the first air bag and a second surface extending into the second air bag;

means for coupling the right and left air bag means to the chassis and respective transversely spaced wheels such that vertical displacement of the chassis relative to the wheels will result in compression of one air bag within the air bag means and expansion of the other; and means for varying the resultant force which opposes upward movement of the wheels with respect to the vehicle chassis such that the resultant force increases less rapidly than would otherwise be dictated by increased pressure within the air bag, the first air bag and the second air bag being substantially the same size, the piston member being pivotally mounted to the vehicle chassis, the air bags further being positioned with respect to the piston member such that the first air bag and the second air bag will have different lever arms.

11. A vehicle suspension system for resiliently suspending the vehicle chassis above an axle, which comprises:

a vertically stacked pair of air bags mounted to the vehicle chassis near opposite ends of the axle, the pair including an upper air bag and a lower air bag;

a pair of pistons coupled to opposite sides of the axle for movement therewith, each piston suspended between the air bags of a corresponding stacked pair of air bags for resiliently suspending the vehicle chassis above the axle;

means for decreasing the net effective area of the upper air bag and lower air bag when the piston moves upwardly;

means for interconnecting the air bags of each stacked pair, the interconnecting means placing the upper air bag of each vertically stacked pair in fluid communication with the lower air bag of the other vertically stacked pair, thereby providing a low vertical spring rate and a high roll spring rate.

12. The system of claim 11 wherein the net effective area decreasing means comprises a tapered outer surface on the piston.

13. The system of claim 11 wherein the portion of the piston within the bag tapers radially inwardly and away from the bag.

14. A vehicle suspension system in accordance with claim 13, additionally including a second such vehicle suspension system positioned on a second axle of the same vehicle, spaced longitudinally of the first axle, the systems being interconnected such that the upper air bags on each of the axles are in fluid communication with one another and the lower air bags on each side of the axles are in fluid communication with one another, thereby providing an equalizing function between the two axles.

15. A suspension system for a vehicle having an elongated vehicle frame and transversely spaced wheels supporting the chassis, which comprises:

a first and second bag assembly, each assembly suspending the frame above a corresponding wheel, each assembly comprising:

a piston member pivotally mounted to the frame at a first pinned connection, the piston member being coupled to the corresponding wheel at a location spaced apart from the first pinned connection such that upward movement of the wheel will cause the piston to rotate about the first pinned connection;

a first air bag pivotally mounted to the frame at a second pinned connection, the first air bag engaging the piston member at a location intermediate the pinned connections such that an uplifting force on the wheel will cause the first air bag to rotate about the second pinned connection to reduce the force of the first air bag, which opposes upward movement of the wheel in response to upward movement of the wheel;

a second air bag engaging the piston member, the second air bag interposed between the piston member and the frame to oppose downward movement of the wheel; and the air bag assemblies being interconnected to one another such that the first air bag of the first air bag assembly is in fluid communication with the second air bag of the second air bag assembly, and the second air bag of the first air bag assembly is in fluid communication with the first air bag of the second air bag assembly such that the suspension system can provide both stiff roll spring protection and soft vertical spring protection from the air bag assemblies.

16. A suspension system for a vehicle having an elongated vehicle frame and transversely spaced wheels supporting the chassis, which comprises:

a first and second bag assembly, each assembly suspending the frame above a corresponding wheel, each assembly comprising:

a piston member pivotally mounted to the frame at a piston connection location, the piston member coupled to the corresponding wheel at a coupling location for vertical movement with the wheel, the coupling location spaced apart from the piston connection location such that vertical displacement of the wheel will cause the piston member to rotate about the piston connection location;

a first air bag interposed between the piston member and the frame to oppose upward movement of the wheel with respect to the frame, the firts air bag pivotally mounted to the frame at an air bag connection location longitudinally spaced apart from the piston connection location, the first air bag engaging the piston member at an engagement location and the air bag connection location such that rotation of the pisto member in response to an uplifting force on the wheel will cause the first air bag to rotate about the air bag connection, thereby reducing the effective opposing force of the first air bag to provide a soft vertical spring;

a second air bag engaging the piston member, the second air bag interposed between the piston member and the frame to oppose downward movement of the wheel with respect to the frame; and the air bag assemblies being interconnected to one another such that the first air bag of the first air bag assembly is in fluid communication with the second air bag of the second air bag assembly, and the second air bag of the first air bag assembly is in fluid communication with the first air bag of the second air bag assembly such that the suspension system can provide both stiff roll spring protection and soft vertical spring protection from the air bag assemblies.

* * * * *